United States Patent [19]
Welburn

[11] Patent Number: 4,481,453
[45] Date of Patent: Nov. 6, 1984

[54] TORQUE LOOP CONTROL SYSTEM AND METHOD

[75] Inventor: Ross D. Welburn, Santa Rosa, Calif.

[73] Assignee: Motornetics Corporation, Santa Rosa, Calif.

[21] Appl. No.: 401,106

[22] Filed: Jul. 23, 1982

[51] Int. Cl.³ .............................................. H02K 29/04
[52] U.S. Cl. ..................................... 318/696; 318/685
[58] Field of Search ........................ 318/696, 685, 675

[56] References Cited

U.S. PATENT DOCUMENTS 4,056,763 11/1977 Debrie et al. ....................... 318/675
4,349,771 9/1982 Buxton ................................. 318/685

*Primary Examiner*—S. J. Witkowski
*Assistant Examiner*—Saul M. Bergmann
*Attorney, Agent, or Firm*—Philip M. Shaw, Jr.

[57] ABSTRACT

The present invention is a torque loop control system for reducing the angular position error in a microstepping motor movement when the motor is under a torsional load comprising means for sensing the torsional load on a microstepping motor and producing a sensor output signal indicative of the torsional load, means for receiving and summing an input signal indicative of the desired position of the microstepping motor and the sensor output signal and for producing as an output signal a corrected position signal, and means responsive to the corrected position signal for developing a drive signal for the microstepping motor.

6 Claims, 2 Drawing Figures

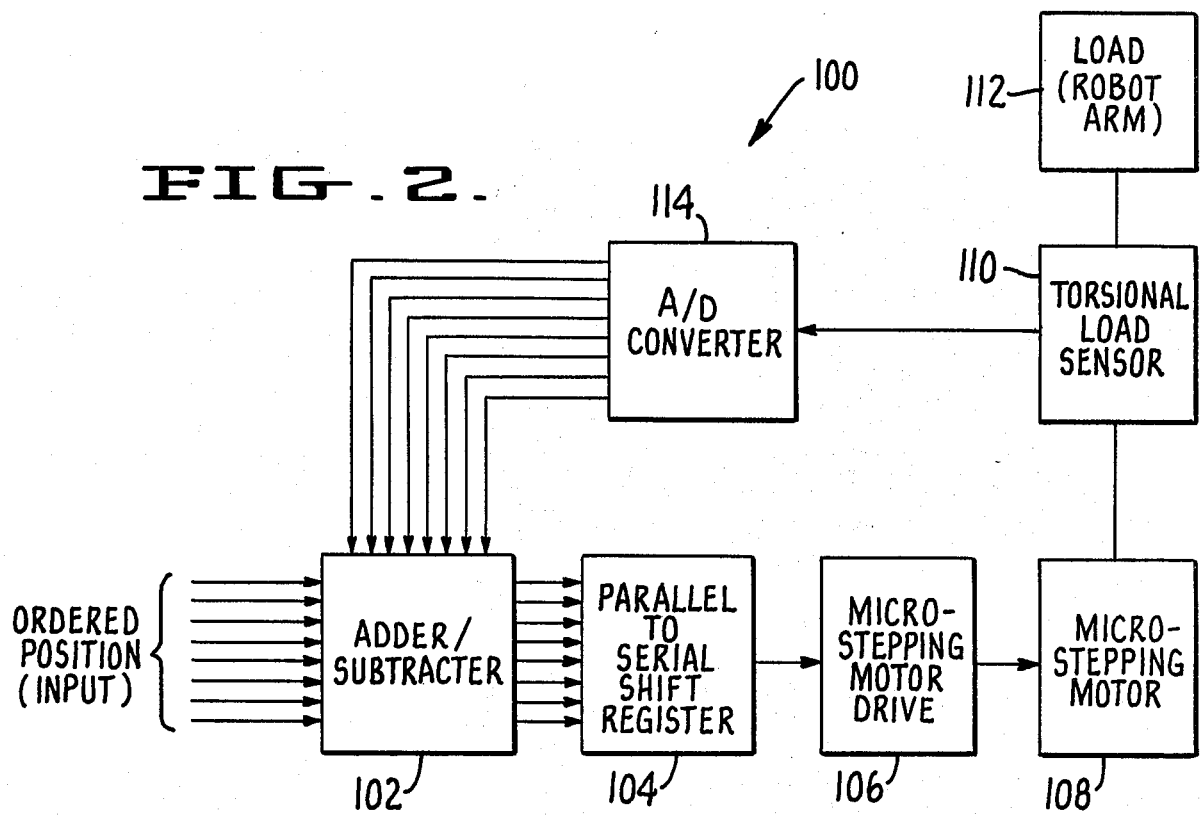
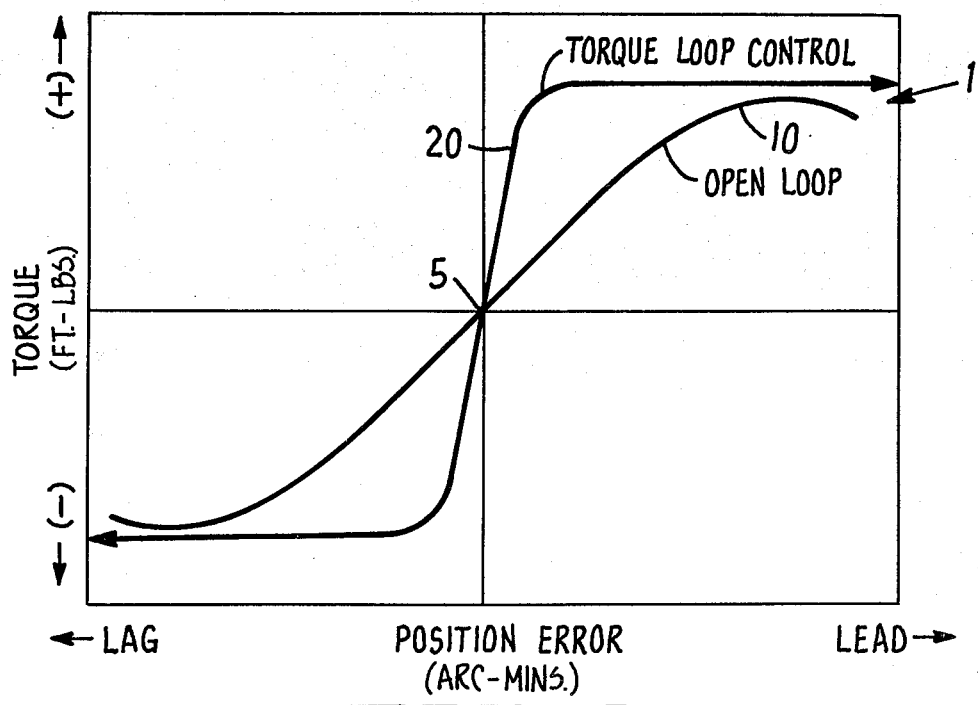

TORQUE LOOP CONTROL SYSTEM AND METHOD

BACKGROUND OF THE INVENTION

It is known to use stepping motors, specifically microstepping motors, in robots for movement of extremities such as arms.

In normal situations such microstepping motors operate in an open loop system. In such systems an ordered position signal for a desired position of the motor, e.g. rate and direction signals, is received by a motor drive assembly. The drive assembly has a memory (logic circuit) and means to convert the position signal into discrete voltages to drive the motor. After the conversion of the position signal, the motor is driven in accordance with the applied voltage in discrete magnetic steps. However, the torsional load on the motor created by movement of the load causes an angular position error (or lag) in the motor. This will result in an improper final position for the load moved by the motor.

In robotic applications in which full stepping or microstepping motors are operated in an open loop, there are no means to compensate for the error caused by the torsional load on the motor. Because of this, the resultant error can be as much as + or − one magnetic step depending on the amount of the load.

When the motor encounters a load, it lags in position up to one magnetic step or less depending on the size of the load. If the motor is decelerating or braking, torque is being applied to the motor from the load a and phase lead of up to one magnetic step occurs. In either case, the motor's positional accuracy is degraded.

The present invention overcomes this problem by providing a torque loop control system and method to control the microstepping motor when it experiences a torsional load.

SUMMARY OF THE INVENTION

The present invention is a torque loop control system for reducing the angular position error in a microstepping motor when it experiences torsional loads.

This present invention also reduces the dynamic position error or oscillation when the motor is moving. The overshoot oscillation that occurs when stopping (setting time) is also reduced.

The control system comprises sensor means for sensing the torsional load on the microstepping motor and for producing an output signal indicative of the torsional load, means for receiving and combining an input signal indicative of a desired position of the microstepping motor and the output signal indicative of the torsional load on the microstepping motor, said means producing as an output signal a corrected position signal, and means responsive to the corrected position signal for driving the microstepping motor.

In the primary embodiment of the present invention, a strain gauge is affixed to the drive mechanism from the microstepping motor to the load. The strain gauge can also be placed at the motor itself. The strain gauge senses and measures the torsional load on the microstepping motor caused by motor moving the load. The sensor produces an analog output signal which is converted into a digital signal and is combined with the original desired position signal. The combined or corrected signal is transmitted to a motor drive assembly which produces voltages to drive the motor in the desired direction and rate plus the amount necessary to compensate for the torsional load on the motor.

It is therefore an object of the present invention to provide a torque loop control system for reducing the angular position error in a microstepping motor when the motor experiences a torsional load.

It is also an object of this invention to provide damping from oscillatory conditions, stimulated by either the motor's motion or a change in torque load.

The novel features which are believed to be characteristic of the invention, both as to organization and method of operation, together with further advantages thereof, will be better understood from the following drawings, in which several preferred embodiments of the invention are illustrated by way of example.

DESCRIPTION OF THE DRAWINGS

FIG. 1 shows two graphs of the angular position error for a microstepping motor versus torsional loading experienced by the motor with and without the torque control feature of the present invention.

FIG. 2 shows a schematic block diagram of the torque loop control system of the invention.

DETAILED DESCRIPTION OF THE DRAWINGS

Referring to FIG. 1, the graph of the curves for angular position error vs. the torsional load on a microstepping motor is generally shown at 1. Curve 10 represents the angular position error of the microstepping motor due to torsional loading in an open loop system and curve 20 represents the angular position error due to the same torsional loading when the torque loop control system of the invention is used. Position 5 on the graph indicates the angular position error when there is no torsional loading on the microstepping motor or when zero torsional loading is experienced during transitional periods when the motor is reversing directions.

Referring to curve 10 of FIG. 1, prior to any torsional loading of the microstepping motor the motor will encounter no position error. As torsional loading is experienced by the microstepping motor (i.e. torque is negative) there is an angular position error (lag). The resultant angular position error can be up to one magnetic step depending on the magnitude of the loading. Similarly, when the motor is decelerating, the load, due to inertia or gravitational forces, may be applying torque to the motor (i.e. positive torque). This will cause the motor to overshoot the commanded position (lead) by as much as one magnetic step.

When the torque loop control system is used, the angular position error (lag) of the motor is significantly reduced, as seen by comparing curve 20 to curve 10.

The microstepping motor could be any of several types which are well known to those skilled in this art. One such motor is described in U.S. Pat. No. 4,087,732.

Referring to FIG. 2, the torque loop control system of the invention is generally shown at 100. The system in the primary embodiment uses digital integrated circuitry. However, a microprocessor could be used to replace the specific integrated circuits indicated.

When it is desired to move the load (robotic arm) 112 to a specific position, means (not shown) such as a computer or microprocessor provide a parallel digital signal indicative of the desired position. Since there is no torsional load on the microstepping motor in the initial stage, the system of the invention will act as an open loop system and adder/subtractor 102 will only transmit the received digital positional signal to the input of a parallel to serial shift register 104 which converts the parallel digital signal to a serial digital signal. The serial digital signal is output from the parallel to serial shift register 104 and input into microstepping motor drive assembly 106 which contains a logic circuit responsive to the serial digital signal and a means responsive to the output of the logic circuit that converts the signal into discrete voltages for driving the microstepping motor 108, all as explained in the applicant's paper referred to above.

When the microstepping motor 108 experiences a torsional load, created by movement of load 112, the motor will lag the ordered position for the motor. In this situation the ordered position signal must be corrected so that the angular positional error of the microstepping motor 108 will be eliminated or at least reduced. To accomplish this, the torque loop control system is used.

In the system of the invention, the sensor 110 senses the torsional load on the microstepping motor and provides an analog output signal representative of the the torsional load. This analog signal is input into analog to digital converter (A/D converter) 114, which converts the analog signal to a parallel digital signal. The parallel digital signal output from the A/D converter 114 is input to adder/subtractor 102 and summed with the ordered position signal. The output of adder/subtracter 102 will be a parallel digital signal indicative of the ordered or desired position corrected by the quantum value of the torsional load on a microstepping motor 108.

The parallel to serial shift register 104 receives the parallel digital signal output by adder/subtracter 102 and converts it to a serial digital signal. The serial digital signal output by the parallel to series shift register 104 is input to microstepping motor drive 106. The microstepping motor drive 106 will receive the signal in its logic circuit and provide a command position drive signal to microstepping motor 108. The torque corrected command position signal which is output by the logic circuit of the microstepping motor drive 106 will drive stepping motor 108 in a manner such that the lag of the microstepping motor 108 is drastically reduced for greater positional accuracy.

While the torque sensor 110 for this loop could be at the shaft between the motor 108 and the load 112, it could be at the motor 108 for sensing the reaction of the motor frame mount. In robotic applications, this torque sensor 110 could also be in the arm structure itself in the form of a supporting web with a strain gauge attached. Since the arm itself has a stiffness limitation, or sag component, it can be combined with the magnetic position lag of the motor and both will be reduced with this stiffness enhancement servo.

Another advantage of the present system is that an ultra high resolution position sensor is not required because when microstepping this motion, high resolutions are easily attainable directly. High resolution position information is required because small angles at the hub of a robotic arm turn into large displacements at the top of the arm.

Another use of this stiffness enhancement servo is damping. In a velocity feedback servo damping information is derived by differentiating the velocity signal. The problem is when the system's inertia changes the differentiated signal also changes. So different servo damping parameters are required depending on the extension length of the arm or the mass of the load in the hand. The stiffness enhancement servo has damping information based on force (torque), not on velocity, so the output amplitude is independent of load, thereby simplifying the servo design.

While the above described torque loop control system is described as being in digital form, in other embodiments it could be in analog form. In such embodiments the ordered position signal would have to be in analog form, or be converted to analog form, and the analog signal from the sensor 110 would then be combined with it to reduce the positional error, i.e. a sensor signal produced by negative torque on the motor would be added and a sensor signal produced by positive torque on the motor would be subtracted.

The terms and expressions which have been employed here are used as terms of description and not of limitation and there is no intention, in the use of such terms and expressions, of excluding equivalents of the features shown and described, or portions thereof, it being recognized that various modifications are possible within the scope of the invention as claimed.

I claim:

1. A torque loop control system for reducing angular position error in microstepping motor movement when the motor is under a torsional load comprising:
   (a) means for sensing the torsional load on a microstepping motor and for producing an output signal indicative of the torsional load;
   (b) combining means for receiving the output signal indicative of the torsional load on the microstepping motor and for summing it with an input signal indicative of a desired position of the microstepping motor, said means producing as an output signal a corrected position signal; and
   (c) drive means responsive to the corrected position signal for driving the microstepping motor in accordance therewith.

2. The system as recited in claim 1 wherein the input signal indicative of the desired position of the microstepping motor is a parallel digital signal.

3. The system as recited in claim 2 wherein the means for sensing the torsional load on the microstepping motor includes a strain gauge for producing an analog signal indicative of the torsional load and analog to digital converter means for converting the analog signal to a parallel digital output signal which is supplied to the combining means.

4. The system as recited in claim 3 wherein the combining means includes an adder/subtracter means which provides as an output signal a parallel digital signal indicative of the desired position of the microstepping motor corrected by the output of the sensing means.

5. The system as recited in claim 4 wherein the drive means comprises a parallel to serial shift register means for converting the parallel digital signal output from the adder/subtracter means to a serial digital motor driving signal.

6. The system as recited in claim 1 wherein the torsional load sensing means is located between the motor and the load.

* * * * *